(12) United States Patent
Karlsson

(10) Patent No.: US 12,076,823 B2
(45) Date of Patent: Sep. 3, 2024

(54) BRAKING ENERGY RECOVERY CIRCUIT

(71) Applicant: ESAB AB, Gothenburg (SE)

(72) Inventor: Rolf Karlsson, Laxå (SE)

(73) Assignee: ESAB AB, Gothenburg (SE)

( * ) Notice: Subject to any disclaimer, the term of this patent is extended or adjusted under 35 U.S.C. 154(b) by 640 days.

(21) Appl. No.: 17/187,917

(22) Filed: Mar. 1, 2021

(65) Prior Publication Data

US 2022/0274198 A1 Sep. 1, 2022

(51) Int. Cl.
| | |
|---|---|
| *B23K 9/09* | (2006.01) |
| *B23K 9/095* | (2006.01) |
| *B23K 9/10* | (2006.01) |
| *B23K 9/16* | (2006.01) |
| *G05B 19/406* | (2006.01) |

(52) U.S. Cl.
CPC .......... *B23K 9/0953* (2013.01); *B23K 9/1062* (2013.01); *B23K 9/1075* (2013.01); *B23K 9/164* (2013.01); *G05B 19/406* (2013.01); *G05B 2219/45135* (2013.01)

(58) Field of Classification Search
CPC .. B23K 9/0953; B23K 9/1062; B23K 9/1075; B23K 9/164; B23K 9/092; B23K 9/1043; B23K 9/1006; G05B 19/406; G05B 2219/45135
USPC .......................................... 700/212
See application file for complete search history.

(56) References Cited

U.S. PATENT DOCUMENTS

| | | | |
|---|---|---|---|
| 4,717,807 A | 1/1988 | Parks et al. | |
| 6,177,645 B1 | 1/2001 | Church et al. | |
| 6,815,639 B2 | 11/2004 | Geissler | |
| 6,987,242 B2 | 1/2006 | Geissler | |
| 7,183,517 B2 | 2/2007 | Albrecht et al. | |
| 7,235,759 B2 | 6/2007 | Geissler | |
| 9,156,103 B2 | 10/2015 | Salsich | |
| 9,308,598 B2 | 4/2016 | Madsen et al. | |
| 9,579,742 B2 | 2/2017 | O'Donnell et al. | |
| 9,662,735 B2 | 5/2017 | Salsich et al. | |
| 9,751,150 B2 | 9/2017 | Daniel et al. | |
| 9,878,393 B2 | 1/2018 | Salsich et al. | |
| 9,878,395 B2 | 1/2018 | Salsich et al. | |
| 10,207,351 B2 | 2/2019 | Henry | |
| 10,279,415 B2 | 5/2019 | Hsu et al. | |
| 2001/0054602 A1* | 12/2001 | Watanabe ............ | B23K 11/241 219/110 |
| 2010/0230389 A1 | 9/2010 | Hsu et al. | |
| 2011/0011842 A1 | 1/2011 | Thomas | |

(Continued)

FOREIGN PATENT DOCUMENTS

RU 2547048 4/2015

OTHER PUBLICATIONS

Notification of Transmittal of International Search Report and Written Opinion including International Search Report and Written Opinion dated Jun. 2, 2022, 13 pages.

*Primary Examiner* — Michael J Brown

(74) *Attorney, Agent, or Firm* — Edell, Shapiro & Finnan, LLC

(57) ABSTRACT

A method includes ramping down a welding current, generated by a power supply, that reaches a welding zone via a welding circuit, storing inductive energy from the welding circuit that is generated as a result of the ramping down to obtain stored energy, and selectively feeding the stored energy to the welding circuit.

19 Claims, 15 Drawing Sheets

(56) References Cited

U.S. PATENT DOCUMENTS

| | | | |
|---|---|---|---|
| 2011/0056923 A1* | 3/2011 | Aberg | B23K 9/1062 |
| | | | 219/130.32 |
| 2012/0067859 A1* | 3/2012 | Albrecht | B23K 9/125 |
| | | | 219/137 R |
| 2012/0195086 A1 | 8/2012 | Karlsson et al. | |
| 2016/0221104 A1 | 8/2016 | Madsen et al. | |
| 2017/0173721 A1 | 6/2017 | O'Connor | |
| 2017/0216953 A1 | 8/2017 | Salsich et al. | |
| 2018/0147649 A1 | 5/2018 | Salsich et al. | |
| 2018/0193938 A1 | 7/2018 | Schuh et al. | |
| 2018/0235037 A1 | 8/2018 | Ostermeyer et al. | |
| 2019/0030634 A1 | 1/2019 | Henry | |

* cited by examiner

BRAKING ENERGY RECOVERY CIRCUIT

BACKGROUND

Metal Inert Gas (MIG)/Metal Active Gas (MAG) welding are welding processes where an electrode is continuously fed toward a working piece. An electric power source generates a welding voltage and a welding current. During the welding process, the workpiece is heated primarily by an arc generated by the power source. The electrode is heated, partly by the power developed in the electrode as the weld current flows through an electrode stick out, and partly by the heat developed by the arc itself. The electrode stick out is a part of the welding wire between a free wire end and a contact tip, where the current transfer to the electrode takes place. An inert gas is fed through the torch and surrounds the weld pool and arc, thus keeping oxygen and any related by-products from contaminating the resulting weld. A basic control of the welding process aims at achieving an electrode melting speed which corresponds to the electrode feed speed. Another basic control of the welding process is to enable the welding process to operate in a desired metal transfer mode. Further objects of the control may be, for instance, to influence the amount of heat transferred to the workpiece.

MIG/MAG-welding takes place in one of three basic metal transfer modes: short arc, mixed arc, and spray. In short arc welding, the material transport from the electrode to the workpiece takes place through short-circuiting droplets.

When the supplied power is increased, the process passes into a mixed arc area, where material transport takes place through a mixture of short-circuiting and non-short-circuiting droplets. The result is an unstable arc which is difficult to control with a risk for much weld spatter and weld smoke. Welding in this area is normally avoided.

At a sufficiently high supplied power, the process enters the spray area, where the material transport takes place through small finely dispersed droplets without short circuits. The spatter quantity is clearly lower than in short arc welding. The heat supply to the base material in this mode is greater and the method is suitable primarily for thicker workpieces.

With reference to the short arc welding modes, portions of a welding cycle constituting a short circuit condition are followed by an arcing (non-short circuit) condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by the power supply control circuit. A premonition circuit is usually provided so that a given increase in dv/dt (i.e., the slope of the voltage) signals the imminent formation of the fuse. By knowing change of voltage over time, the welding current can be controlled down to a background level, or lower, immediately before the fuse occurs. In this way, the energy of the fuse during each welding cycle is drastically reduced. This, in turn, reduces spatter at the termination of the short circuit condition.

In one prior art approach, in order to quickly reduce the current being supplied at the appropriate moment, i.e., just before the fuse, a switch, disposed in the ordinary current path toward a welding zone, may be turned off thereby forcing the current to instead pass through a resistor which increases the voltage drop in the overall welding circuit thus causing the welding current to more quickly ramp down to a lower level. This general approach may be referred to as "current braking."

The embodiments described herein improve upon current braking approaches.

SUMMARY

Disclosed herein are techniques for improving a short arc welding process. A method includes ramping down a welding current, generated by a power supply, that reaches a welding zone via a welding circuit, storing inductive energy from the welding circuit that is generated as a result of the ramping down to obtain stored energy, and selectively feeding the stored energy to the welding circuit.

An apparatus is also disclosed and may include a power source configured to deliver welding current to a welding zone via a welding circuit, a current brake disposed between the power source and the welding zone, and a braking energy recovery module configured to: ramp down the welding current that reaches the welding zone via the welding circuit, store inductive energy from the welding circuit that is generated as a result of the ramp down to obtain stored energy, and selectively feed the stored energy to the welding circuit.

BRIEF DESCRIPTION OF THE DRAWINGS

Like numerals identify like components throughout the figures.

DETAILED DESCRIPTION

The reason to implement a current brake in the context of short arc welding is to speed up the ramping down of the welding current while the melted droplet is still shorting the welding arc. Without a current brake the current will normally freewheel for too long because the voltage drop in the droplet and the rest of the welding circuit is rather low, typically 5-15V. By implementing a current brake either according to the prior art or in accordance with the techniques described herein the total voltage drop in the welding circuit can be on the order of 100-300V depending on the design of the circuit. The freewheeling time will be shortened proportional to the increased voltage. That is, given $U=L*di/dt$, then $dt=L*di/U$ meaning that the freewheeling time is shorter if U is relatively large and if L is relatively small.

If the power source is fast (high inverter frequency and small output inductor) and the welding cables are relatively short (such that L is low) it may be possible to ramp down the welding current fast enough by controlling only the power source without a current brake.

However, such an ideal overall system cannot be assumed. As such, a current brake makes it possible to ramp down the current fast enough even if the output inductor is relatively large and the welding cables are relative long (resulting in higher inductance). The disadvantage is then higher inductive energy in the welding circuit ($W=\frac{1}{2}*L*I^2$) in every braking operation, and braking may occur on the order of 80-140 times per second which will result in significant power loss if the braking energy is merely dissipated as heat in a resistor as is the case in the prior art.

Figure 1:
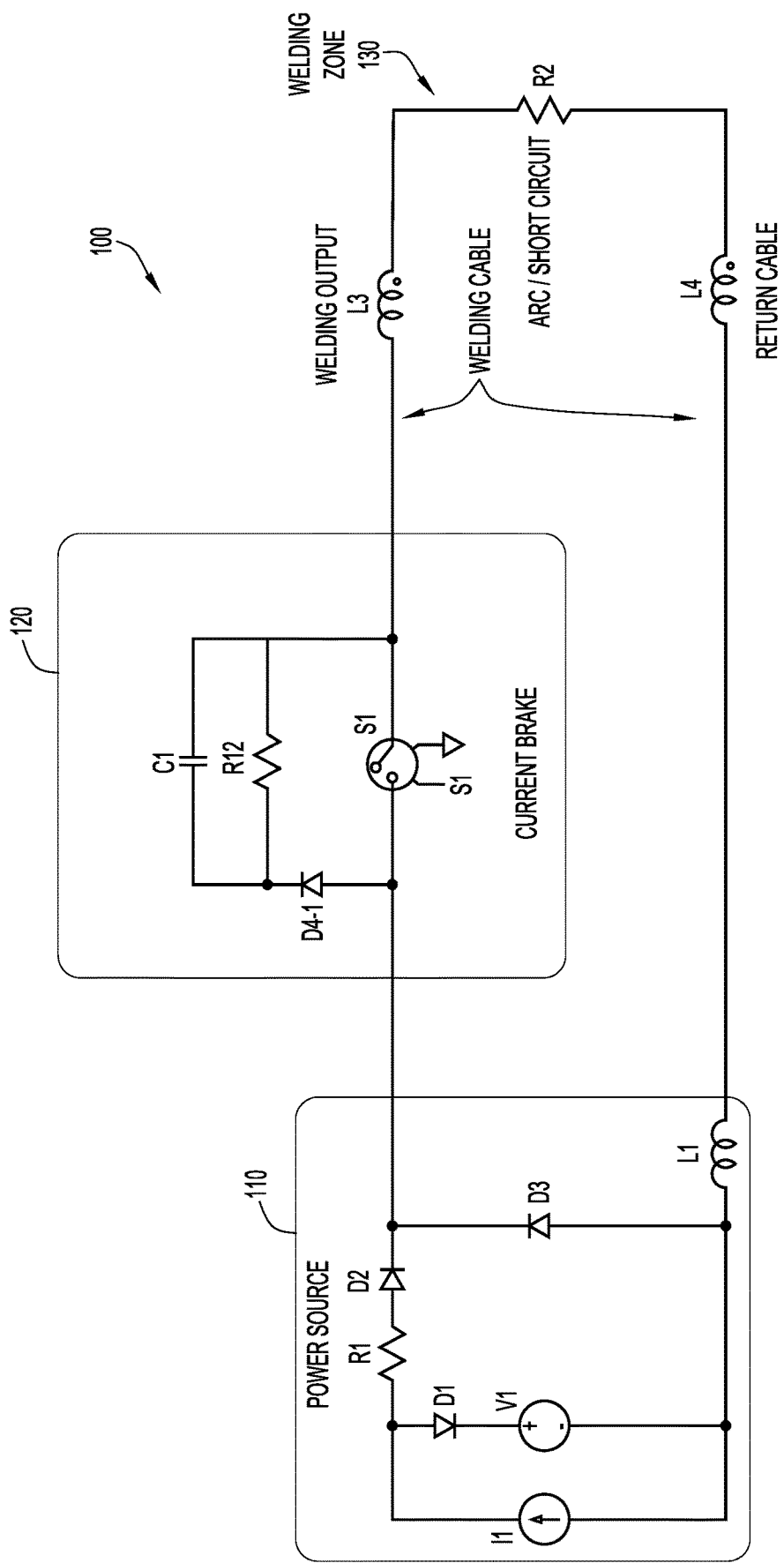
FIG. 1 is a schematic diagram of a welding power supply with a current braking circuit according to the prior art.

More specifically, FIG. 1 is a schematic diagram of a welding power supply with a current braking circuit according to the prior art. The power supply 100 includes a power source 110, a current brake 120, and a welding zone 130. Power source 110 includes a current source I1, a voltage source V1, internal resistance R1, and diodes D1, D2, and D3. Voltage source and diode D1 are shown in the circuit of FIG. 1, which was simulated. In that sense, V1 and D1 are used to limit the voltage from current source I1, which could otherwise by modeled as infinite. The current brake 120 includes switch S1, diode D4-1, capacitor C1 and discharge resistor R12. The welding zone 130 is represented by resistance R2 operating in a short arc welding process, and connected to the power source 110 via cables having inductances L3 and L4.

In operation, switch S1 carries the whole welding current in parallel with diode D4-1 and capacitor C1, and discharge resistor R12 in parallel with capacitor C1. When switch S1 is turned off, welding current will go through diode D4-1, resistor R12, and charge capacitor C1 and produce a high voltage drop over those components. The peak voltage over capacitor C1 is determined by capacitor C1's capacitance value, the parallel discharge resistance R12 and the inductance in the welding circuit (i.e., L1, L3, L4). The capacitance in capacitor C1 should not be chosen to be too high because current braking starts at 0V over the capacitor C1, and capacitor C1 needs to build up sufficient voltage during braking to be effective.

There are several drawbacks associated with the approach shown in FIG. 1. First, there is high power loss in the discharge resistor R12 over capacitor C1. 500-700 W average power loss can occur in the discharge resistor R12 with long welding cables (e.g., on the order of 50 m) or cables that are coiled up. that is, L3+L4 might equal approximately 50 μH (plus the output inductance of inductor L1 in power source 110). Second, there can be high peak voltage over capacitor C1 and also over switch S1. Extra margin in blocking voltage on switch S1 is thus needed to cover variations in welding cable inductance. And, a user might wind the welding cables which results in even higher inductance and higher peak voltage over switch S1. Third, a higher voltage rating on switch S1 normally results in a higher voltage drop during conduction and more conduction loss especially at high output current from the power source 110. As an example, if a 600V IGBT is used as switch S1 it would probably have Vce sat=1V or more, and at 500 A this would give an extra loss of 500 W which creates extra heat and reduces efficiency of the power supply.

Figure 2:
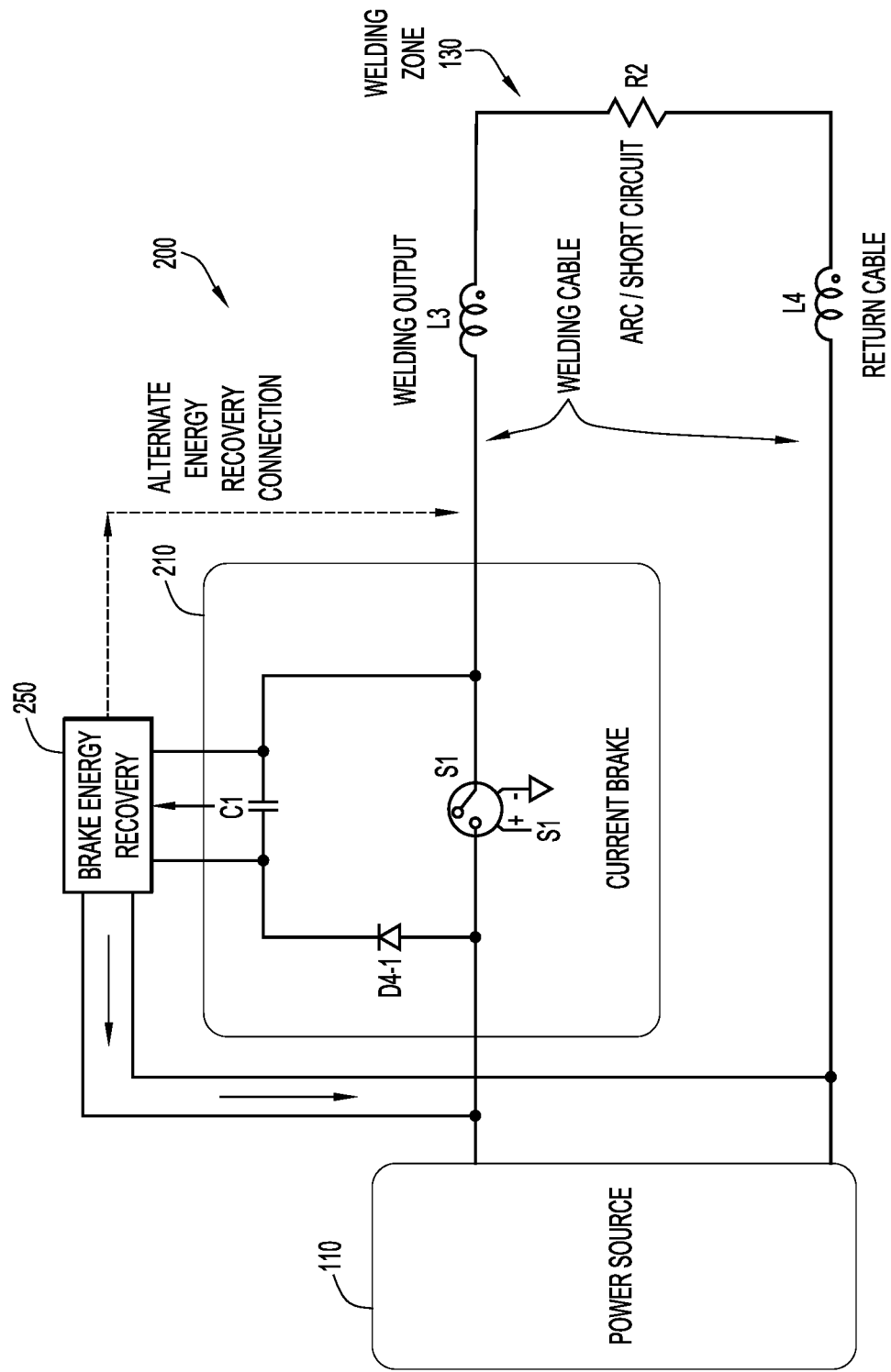
FIG. 2 is a high level schematic diagram of a welding power supply with current braking energy recovery according to an example embodiment.

FIG. 2 is a high level schematic diagram of a welding power supply with current braking energy recovery according to an example embodiment. As shown, the welding power supply 200 includes the power source 110 and welding zone 130 similar to the configuration shown in FIG. 1. A current brake 210 includes switch S1, diode D4-1 and capacitor C1. In addition, a braking energy recovery module 250 is provided. As will become apparent in connection with FIG. 3A, to a large degree, the components of braking energy recovery module 250 are arranged to be operable with capacitor C1, and configured to store inductive energy generated by current braking, and then return the stored energy to the welding circuit.

In operation, the power source 110 delivers welding current with switch S1 conducting. In GMA short arc (with melted droplets shorting the arc) some metal spatter usually occurs when the droplet detaches at high current level. This metal spatter can be reduced by decreasing the welding current rapidly during short circuit just before the melted droplet detaches. A typical DC welding power source can ramp down the current itself with switch S1 conducting but the inductance L3, L4 in the welding cables and the output inductor L1 in the power source 110 will make the current freewheel, which slows down the desired quick ramp down in current. That is, as previously noted, it is preferable to ramp down the current faster. The voltage drop in the welding circuit is mostly determined by the welding wire stick out, typically 5-15V when current is ramping down, and such a low voltage drop results in relatively long freewheeling. By adding the current brake 210, an additional, much higher, voltage drop can be introduced in the circuit which can make current decrease faster.

A goal of the embodiments described herein is to store the inductive energy in capacitor C1 during current braking and then feed that energy back into the welding circuit using the braking energy recovery module 250 when braking is finished.

Figure 3A:
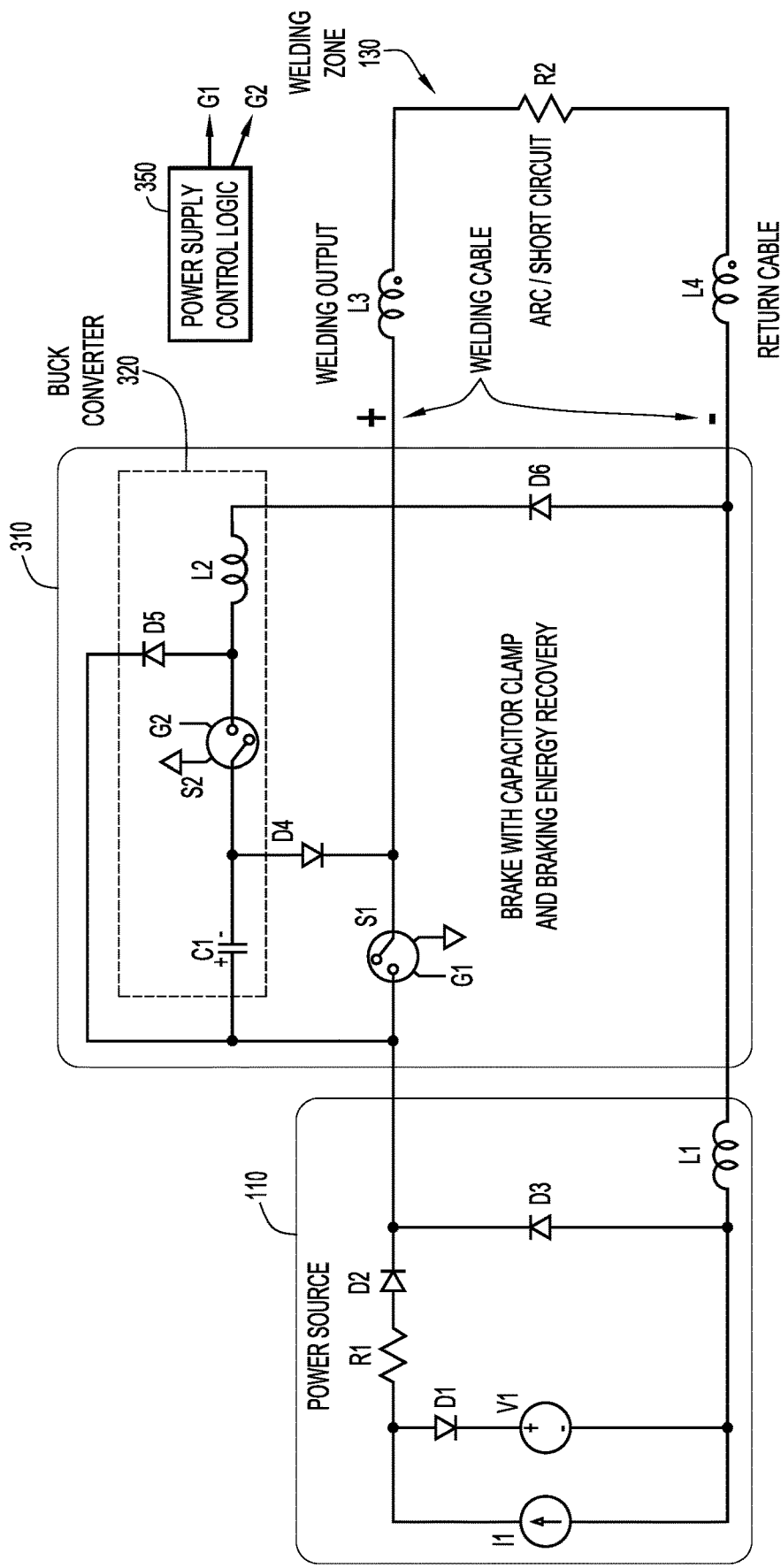
FIG. 3A is a schematic diagram of a welding power supply with current braking energy recovery according to an example embodiment.

FIG. 3A is a detailed schematic diagram of a welding power supply with current braking energy recovery according to an example embodiment. In the depicted embodiment, a current brake with capacitor clamp and braking energy recovery module 310 is provided. Power source 110 and welding zone 130 are the same as previously described. In the case of the embodiment depicted in FIG. 3A, a buck converter 320 comprising capacitor C1, switch S2, inductor L2 and diode D5 is provided. Those skilled in the art will appreciate that other forms of converters could be employed, such as DC-DC converter. Diode D4 provides similar functionality as diode D4-1 in, e.g., FIG. 2, but is located in a slightly different position and is oriented differently. Also, diode D6, connected to welding output minus (−) is used to block current if welding voltage goes higher than the voltage over capacitor C1, which may happen at welding starts. Diode D6 is thus employed to avoid arc outs and also to protect the body diode in switch S2 if switch S2 is a MOSFET transistor. Braking energy is stored in capacitor C1 and then fed back to the welding circuit under the control by the buck converter 320 that is controlled via switch S2.

Power supply control logic 350 is provided to control switch S1 and switch S2 via gate G1 and gate G2, respectively.

At a high level, the circuit of FIG. 3A operates, under the control of power supply control logic 350, as follows.

1. Normal current control: switch S1 conducts and the power source 110 delivers welding current to the welding zone 130 (i.e., the arc).
2. Braking: during current braking, switch S1 is turned off and, if possible, it is preferable to also turn off the power source 110. As a result, the current will now freewheel through inductor L1, diode D3, capacitor C1, diode D4, inductance L3, resistance R2 and inductance L4. Capacitor C1 will be charged by the freewheeling current.
3. S1 is turned on again and will stay on, once braking is finished.
4. Energy recovery: for energy recovery, switch S2 is turned on and ramps up current through inductor L2, switch S2, capacitor C1, switch S1, inductance L3, resistance R2, inductance L4, and diode D6. When current has reached desired peak value (by, e.g., monitoring current by power supply control logic 350), switch S2 is turned off and current will freewheel through inductor L2, diode D5, switch S1, inductance L3, resistance R2, inductance L4, and diode D6. This sequence is repeated until capacitor C1 has been discharged to a desired level, whereupon braking energy recovery is deemed finished. The voltage over capacitor C1 will build up during a number of braking cycles at a welding start and the braking energy recovery module 250 will then keep the voltage over capacitor C1 between desired levels during welding. A pre-charge of capacitor C1 may also be desirable.

In one embodiment diode D5 and/or diode D6 can be replaced with a MOSFET transistor with its body diode oriented in the same direction as the diode it is replacing. Such a configuration may reduce the forward voltage drop and improve efficiency, but will of course require additional control from power supply control logic 350.

The braking energy recovery approach described herein has several benefits compared to the conventional technique illustrated by FIG. 1. For example, lower losses and higher efficiency is possible. Specifically, braking energy with, e.g., 50 m long welding cables, might be approximately 660 W in a typical welding system. With braking energy recovery, approximately 90% (or more) of the braking energy can be fed back into the welding circuit as welding current. As such, losses may be reduced from approximately 660 W to approximately 66 W (or less).

Further, lower conduction loss in brake switch S1 is achieved. By using controlled braking energy recovery, capacitor C1 can have larger capacitance with a more constant voltage over it. Compared to the conventional technique the peak voltage over capacitor C1/switch S1 can be reduced. Voltage over capacitor C1/switch S1 will rise more slowly during braking, and braking can more easily be stopped to limit the peak voltage. As an example, by limiting the peak voltage, a 200V MOSFET transistor with significantly lower conduction loss can be used. That is, by changing, for example, from a 600V low saturation IGBT to a 200V MOSFET, conduction loss at 500 A could be reduced from approximately 500 W to approximately 170 W. Thus, lower cost and less cooling may be realized.

The described braking energy recovery approach also enables more possibilities to control the discharge of capacitor C1. For example, it is possible to use a lower voltage over capacitor C1 when inductance in the welding circuit is lower to get the desired di/dt during braking. The recovery current can be controlled by power supply control logic 350 in both level and time to fit the welding process in the best way.

The voltage over the capacitor C1 is preferably limited to 113V or 141V due to open circuit voltage standards which might result is slightly slower braking compared to the conventional technique. If faster braking is desired, a resonant circuit can be added which would increase the peak voltage over switch S1 (resulting in faster braking) and voltage over capacitor C1 can still be limited to 113V.

Figure 3B:
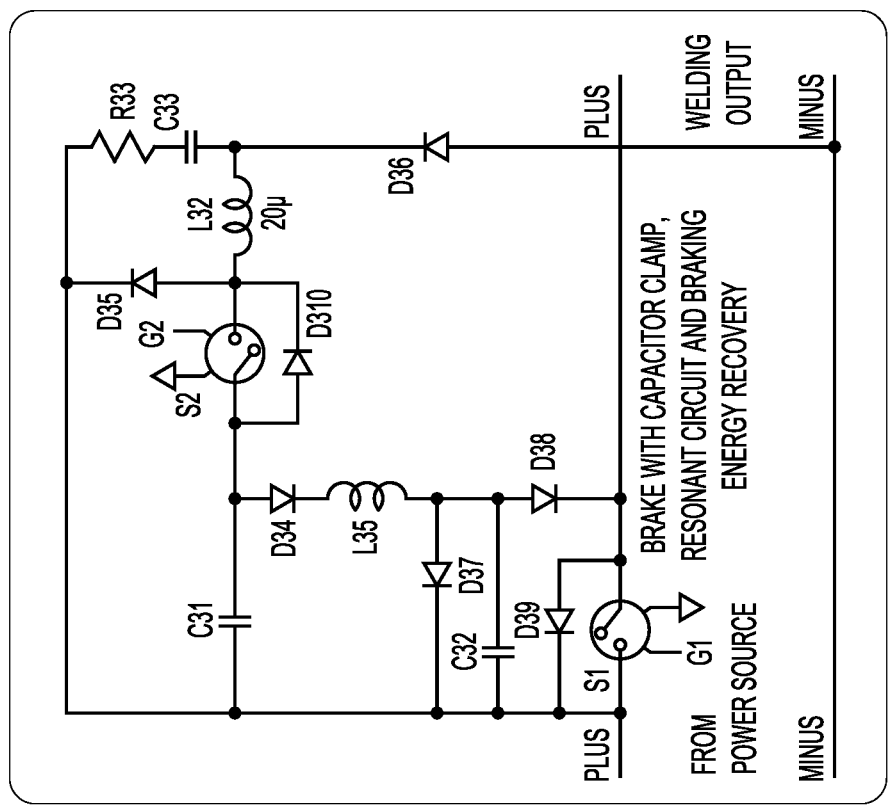
FIG. 3B is a schematic diagram of a welding power supply with current braking energy recovery including a resonant circuit according to an example embodiment.

FIG. 3B is a schematic diagram of a welding power supply with current braking energy recovery including a resonant circuit according to an example embodiment. As shown, switches S1 and S2 may be the same as those in FIG. 3A, with switch S1 controlled to provide current braking, and switch S2 being controlled to selectively return stored energy on C31 to the welding circuit, when S1 closes again after a braking cycle. The circuit comprises diode D36 in series with C33 and R33, and inductor L32 connected between an output of switch S2 and a node between D36 and C33. Diode D35 is connected between the output of switch S2 and an input side of switch S1. Diode D310 is connected across switch S2. Diode D310 may instead be included as a body diode in S2 if S2 is a MOSFET.

Diode D39 is connected across the output and input of switch S1. C31 is connected between the input side of switch S1 and the input side of switch S2. Diode D34, inductor L35 and diode D38 are connected in series between the input side of switch S2 and the output side of switch S1 (i.e., the plus welding power output). Capacitor C32 and diode D37 are connected in parallel between the input side of switch S1 and a node between L35 and D38.

In the circuit of FIG. 3B, R33 and C33 function as a filter to suppress ripple on the output voltage and EMI. This filter can be fairly small because it is within the recovery circuit (D36 separating it from the welding output). R33 may be low resistance or even shorted. The resonant circuit is made up of C32, D37, D34, L35, and D38. With this solution, the peak voltage over switch S1 can be much higher during braking (thus providing faster braking but will again require higher voltage rating on S1) and the voltage on C31 (C1 in FIG. 3A) can still be kept below 113V, thereby providing a very flexible and safe solution regarding OCV, etc. Those skilled in the art will appreciate that FIG. 3B shows only one variant of a filter and resonant circuit. These elements may be implemented using different components and topologies.

A detailed description of the operation of the embodiment of FIG. 3A is now provided in connection with FIGS. 4-10.

Figure 4:
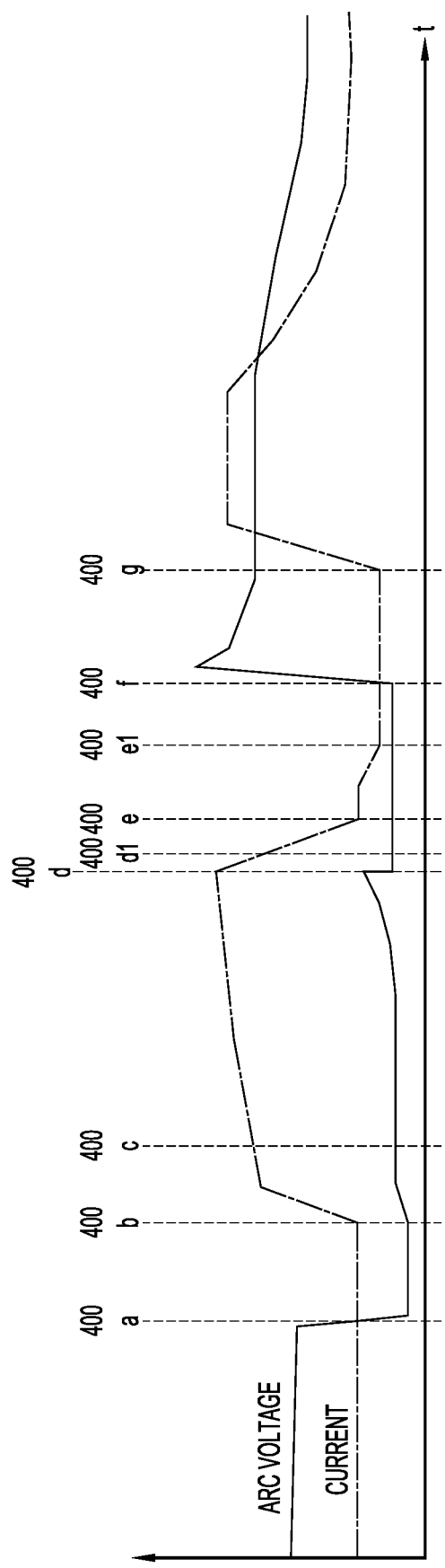
FIG. 4 is a graph of current and voltage at different stages of one arc and short circuit cycle in a short arc welding process aided by a braking energy recovery approach according to an example embodiment.

FIG. 4 is a graph of current and voltage at different stages of one arc and short circuit cycle in a short arc welding process aided by a braking energy recovery approach according to an example embodiment. The several indicated time points along the graph are defined as in the following table.

| | |
|---|---|
| 400a | Welding arc turns to short circuit (melted droplet gets in contact with melted pool) |
| 400b | Short circuit current increase and short circuit regulator (i.e., power supply control logic 350) controls the current |
| 400c | Pinch off detection start to detect the short circuit voltage |
| 400d | Pinch off detection detects du/dt value and start braking, brake switch turns off |
| 400d, d1, e | Current ramping down rapidly within approx. 100 µs |
| 400e | Brake switch turns on again at approx. 70A, braking is finished |

| | |
|---|---|
| 400e1 | Current reaches setting value, approx. 40A |
| 400f | Droplet detaches, arc time begins and arc regulator (i.e., power supply control logic 350) controls the current. |
| 400g | Welding arc current control continues |

FIGS. 5-10 show current paths through the circuit of FIG. 3A at the different stages or time points of the cycle shown in FIG. 4 according to an example embodiment.

Figure 5:
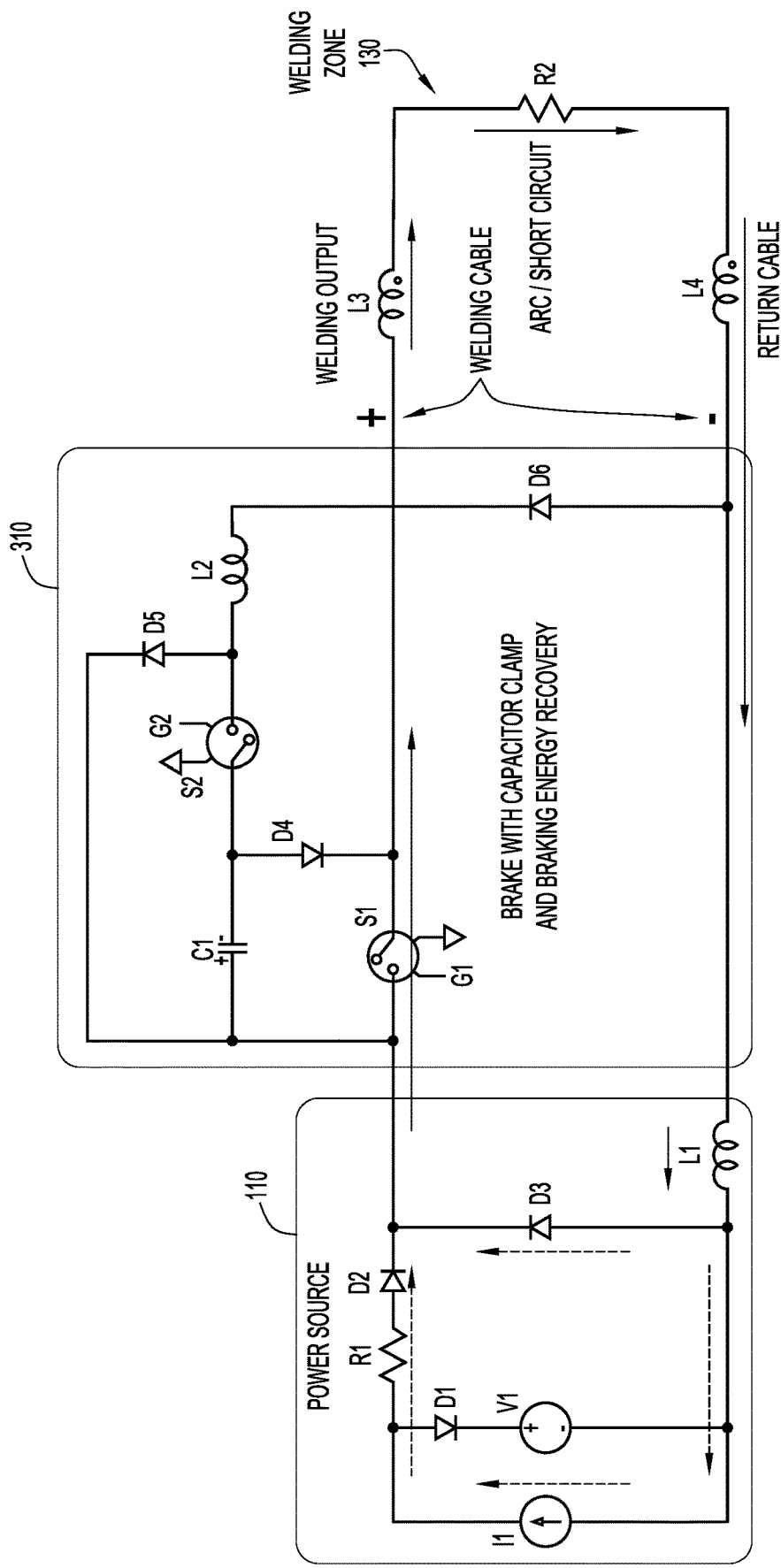
FIGS. 5-10 shows current paths through the circuit of FIG. 3A at the different stages of the cycle shown in FIG. 4 according to an example embodiment.

FIG. 5 represents the sequence of time points "400a-400d" of FIG. 4, wherein switch S1 is conducting and the power source delivers welding current to the welding zone 130.

Figure 6:
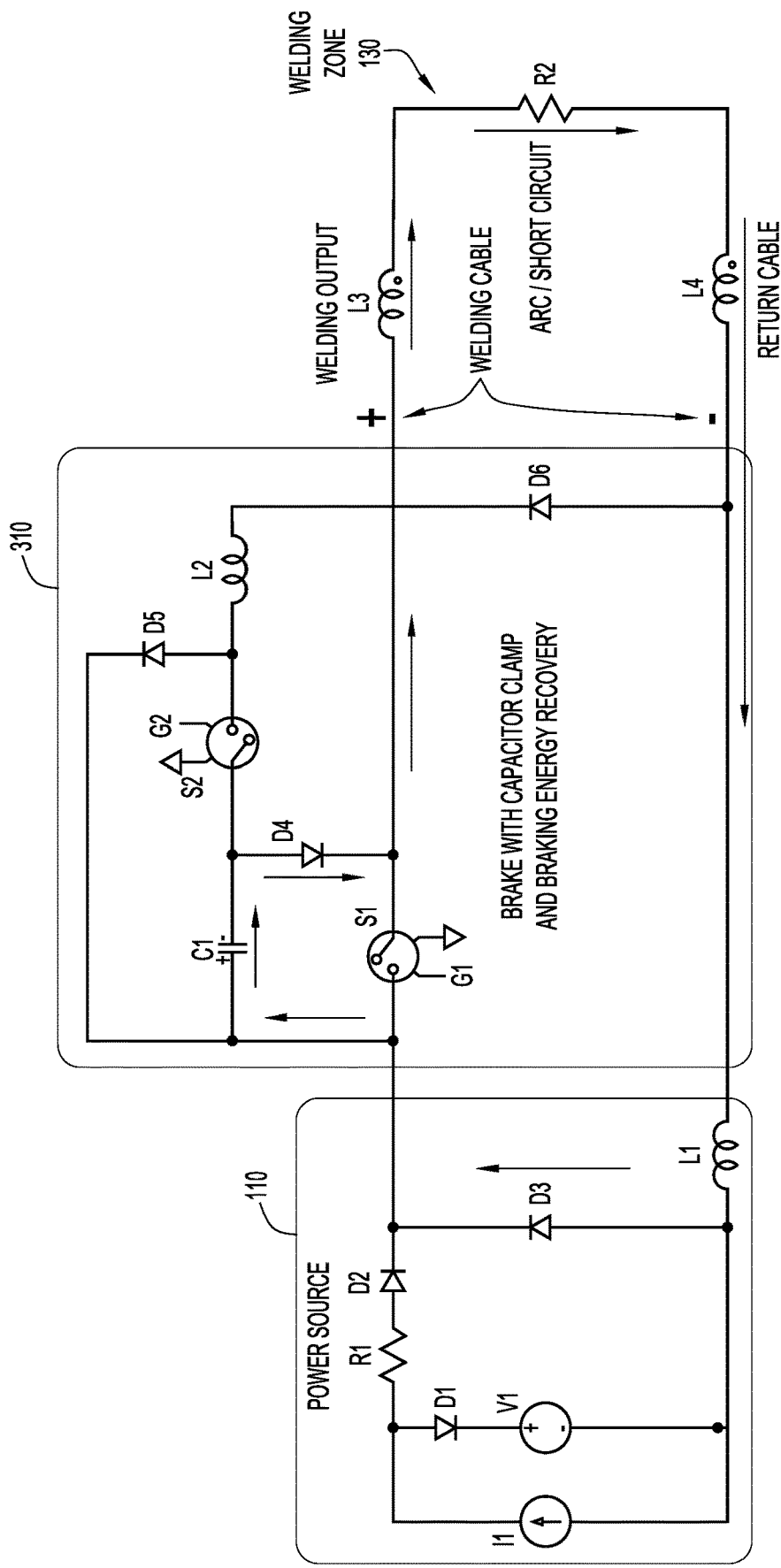

FIG. 6 represents the sequence of time points 400d, 400d1, and 400e of FIG. 4, namely, braking, wherein switch S1 and power source 110 are turned off and current is ramping down fast, freewheeling through capacitor C1, diode D4. The voltage over capacitor C1 and the total inductance in L1, L3, L4 determines how fast the welding current is ramping down. The voltage over stick out (R2) is approximately 5-15V.

Figure 7:
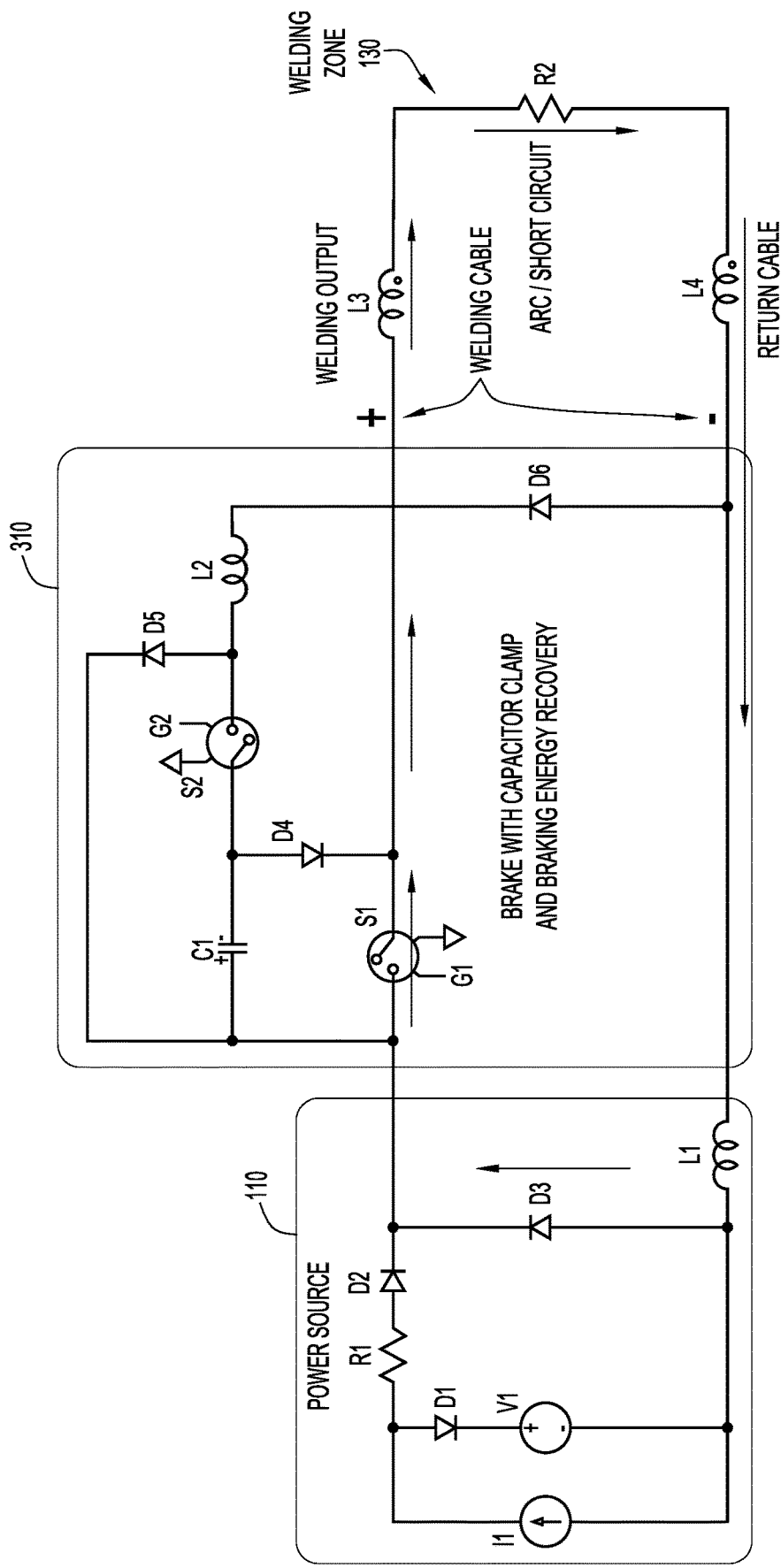

FIG. 7 represents time point 400e of FIG. 4, wherein switch S1 is turned on again, and braking is finished. Current is still decreasing but slower than before.

Figure 8:
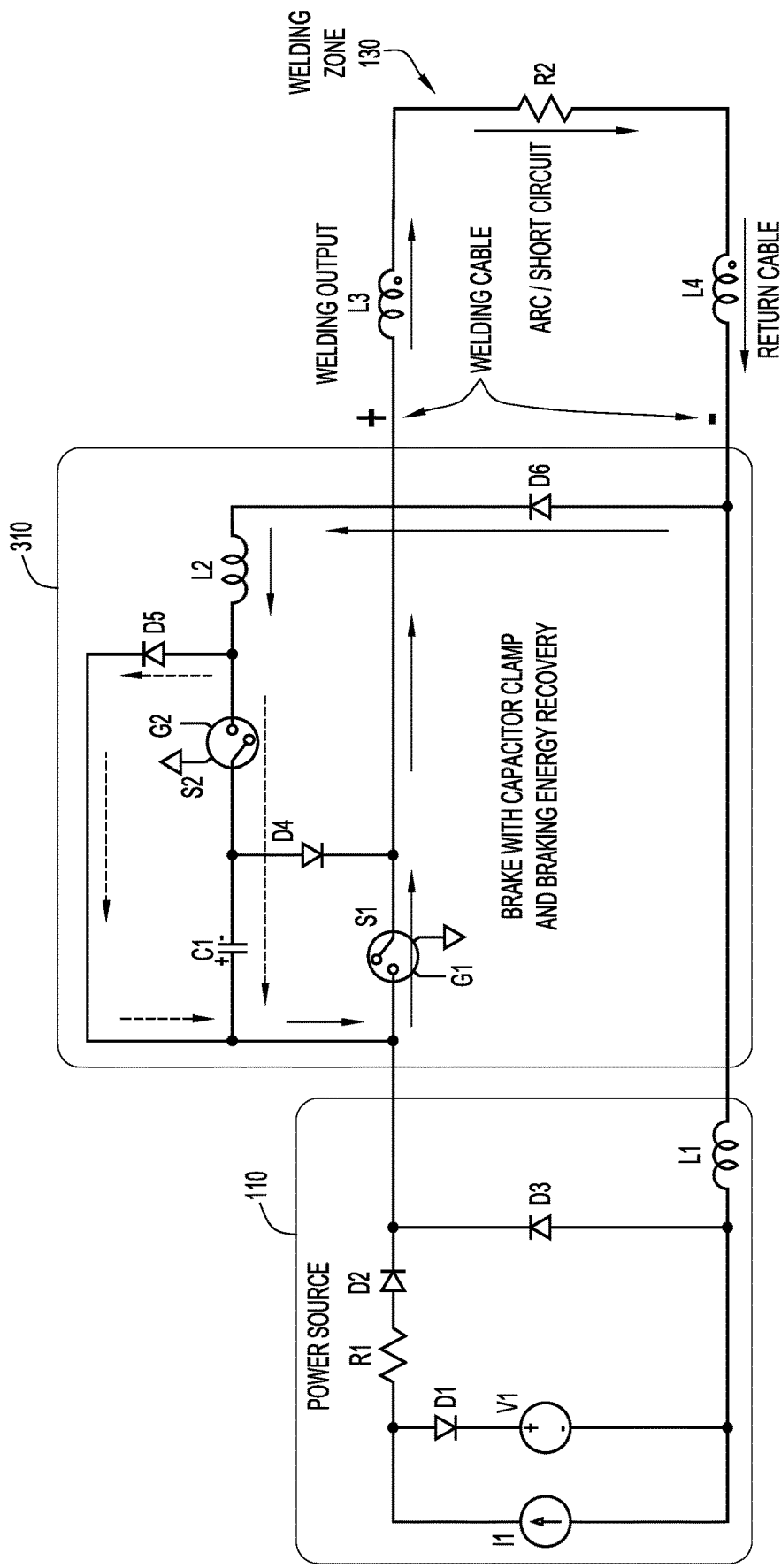

FIG. 8 represents the sequence of time points 400e-400e1, which correspond to a braking energy recovery start up stage. In this stage, switch S1 stays on. Switch S2 also turns on, and current ramps up in inductor L2, switch S2, and capacitor C1. Then, switch S2 turns off and current freewheels through D5. This switching of switch S2 (i.e., the controlled operation of buck converter 320) is repeated to bleed off voltage built up on capacitor C1 and to thus deliver the recovered braking energy back to the welding circuit. Power source 110 also starts up and delivers welding current in parallel with the recovery circuit.

Figure 9:
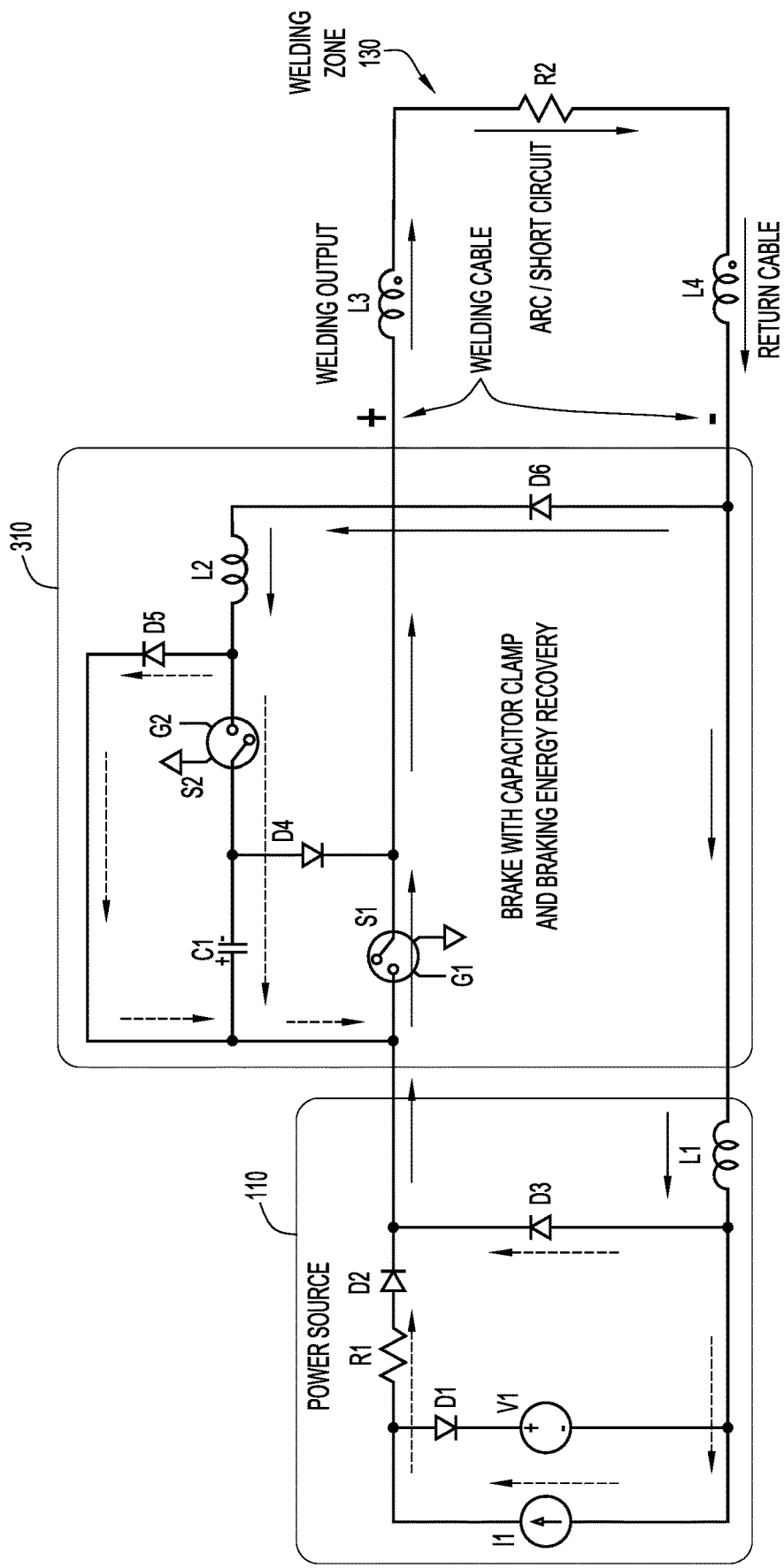

FIG. 9 represents the time points 400e1-400g-400a, wherein power source 110 delivers current in parallel with the braking energy recovery circuit.

Figure 10:
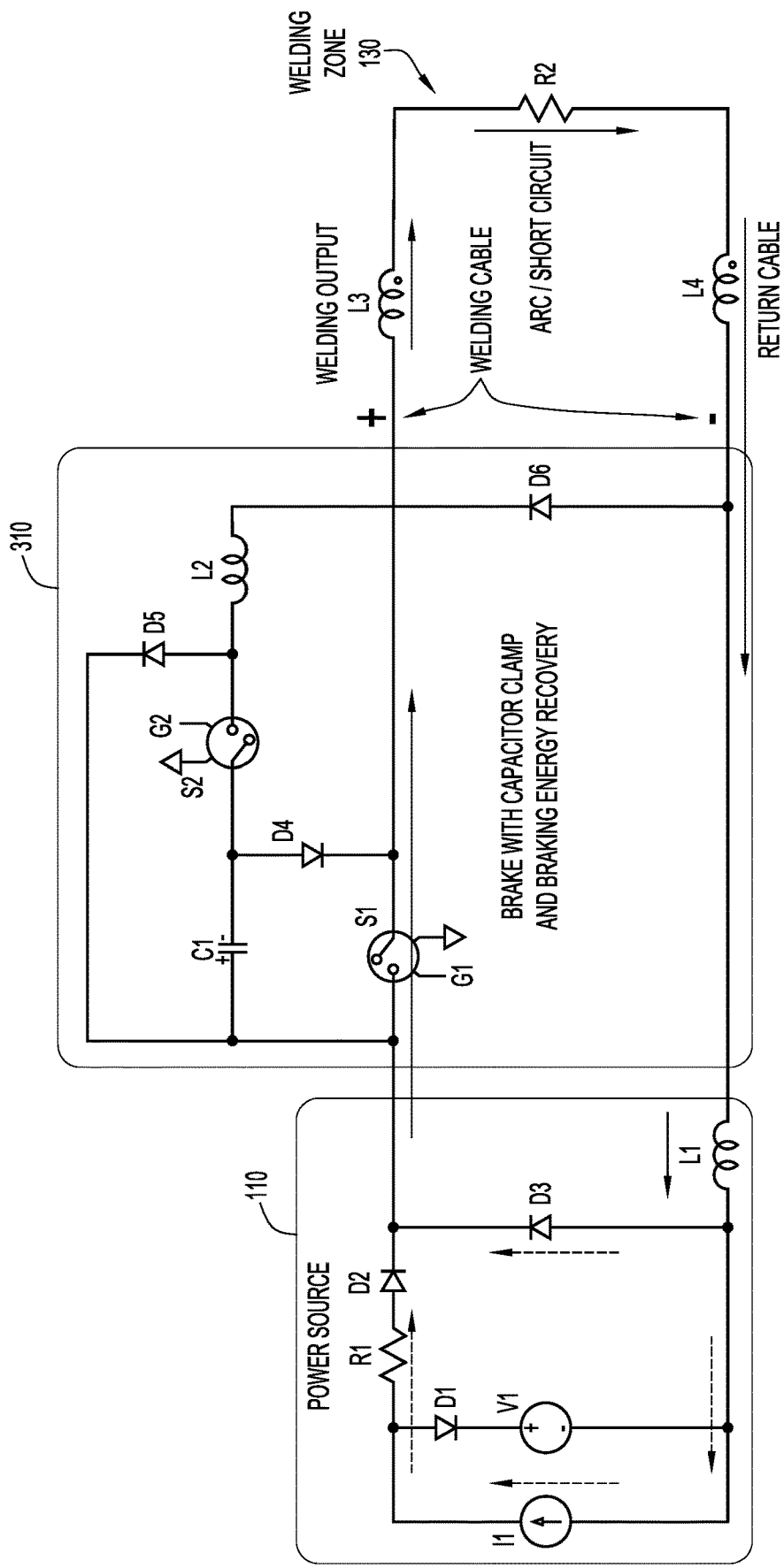

FIG. 10 represents the time points "400e1, 400f, 400b", wherein the buck converter 320 continues delivering a part of the current (30-50 A) until capacitor C1 has been discharged to a desired level, switch S2 turns off and the power source 110 alone delivers the welding current.

Figure 11A:
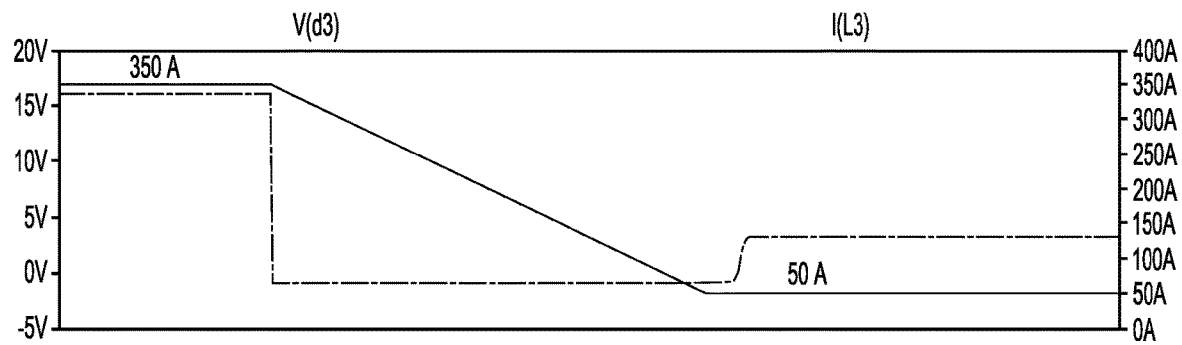
FIGS. 11A-11H depict graphs of a simulation of braking energy recovery according to an example embodiment.
Figure 11B:
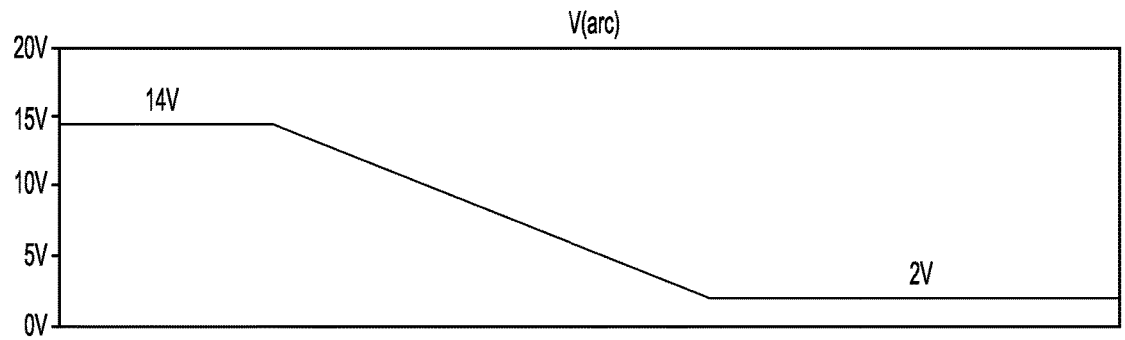
Figure 11C:
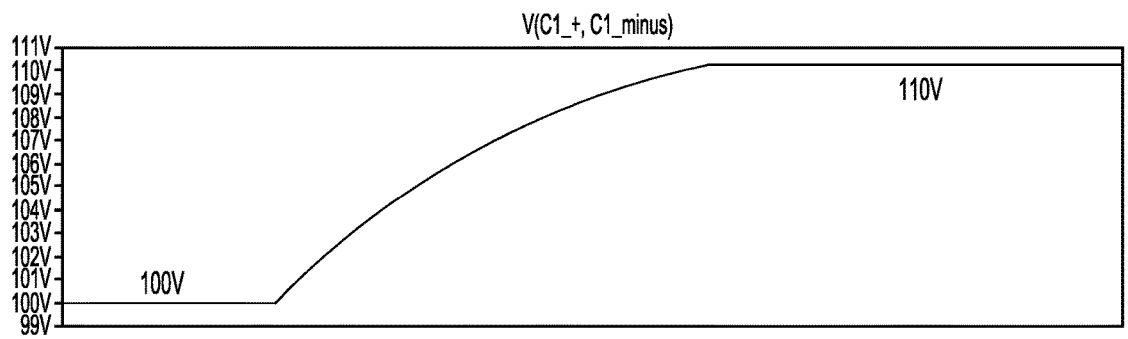
Figure 11D:
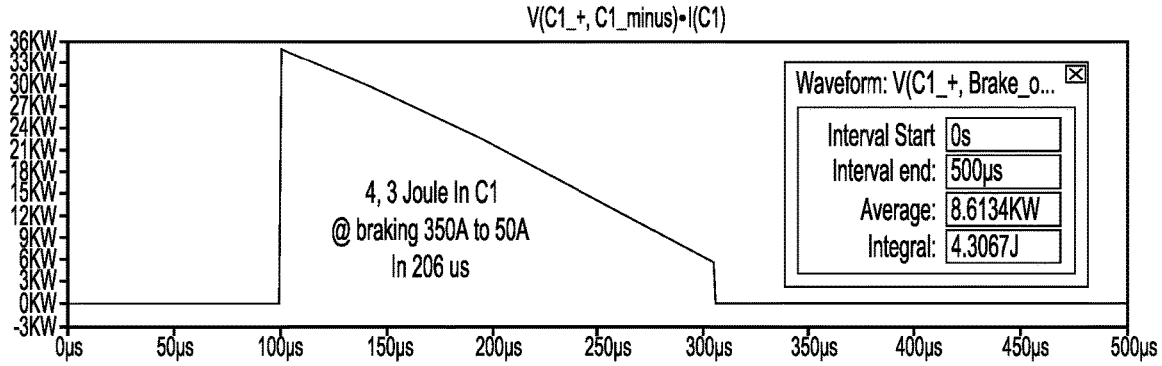
Figure 11E:
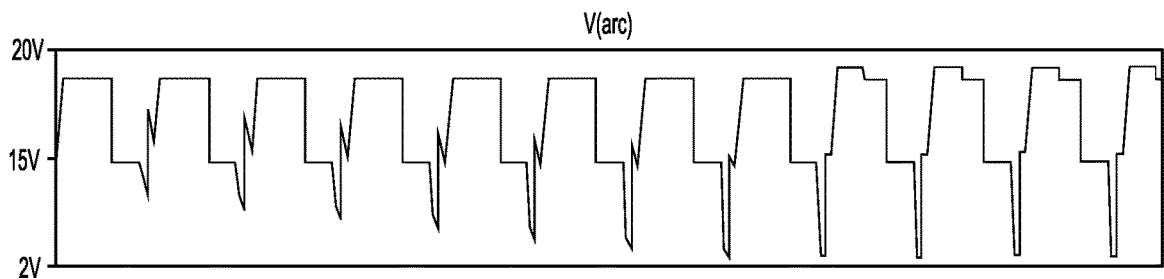
Figure 11F:
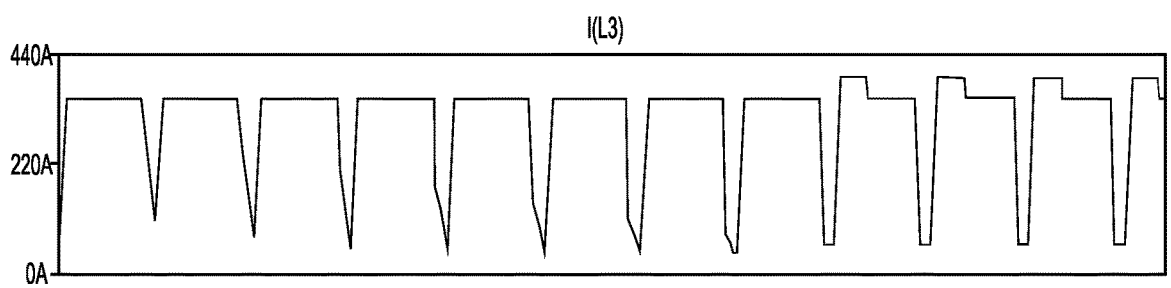
Figure 11G:
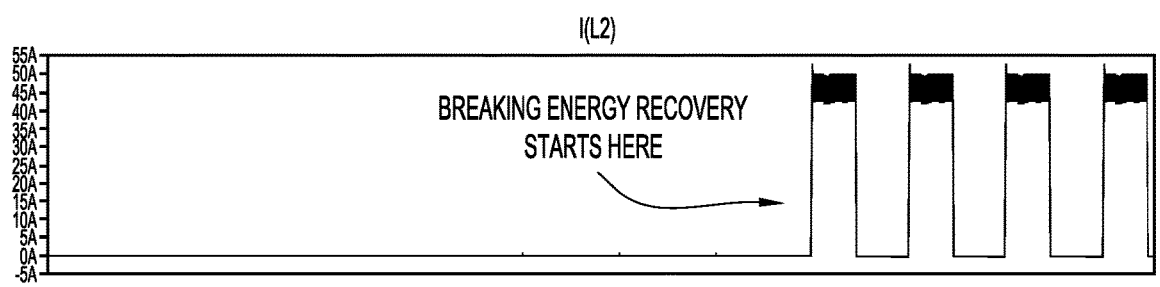
Figure 11H:
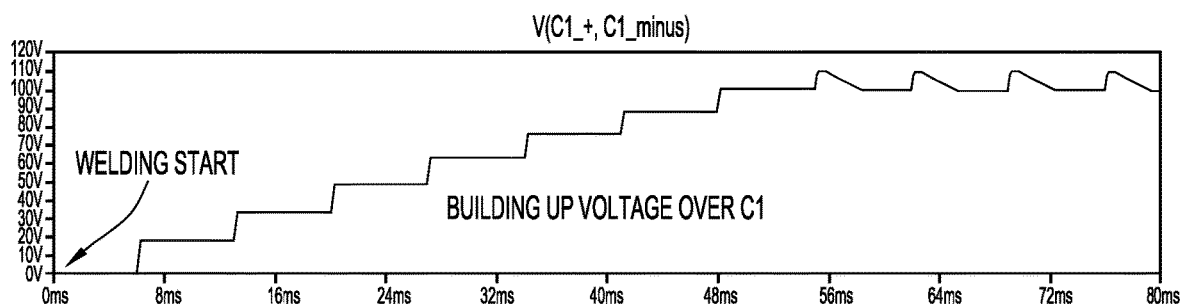

FIGS. 11A-11H depict graphs of a simulation of braking energy recovery according to an example embodiment. FIG. 11A shows current through inductance L3 reducing from 350 A to 50 A at the same time that the voltage drops at the output (at diode D3) of the power supply 110. FIG. 11B shows how the arc voltage at the welding zone 130 decreases more slowly due to inductance in the welding circuit. FIG. 11C shows voltage across capacitor C1 increasing due to current braking. FIG. 11D shows the power (voltage×current) handled by capacitor C1 during current braking. FIG. 11E shows multiple cycles of arc voltage in the welding zone 130. FIG. 11F shows the corresponding current being delivered at the welding zone 130. FIG. 11G shows multiple cycles of braking energy recovery, i.e., energy being returned to the welding circuit after a short, and current brake operation. And FIG. 11H shows build-up of voltage over capacitor C1 from welding start to steady state operation.

Figure 12:
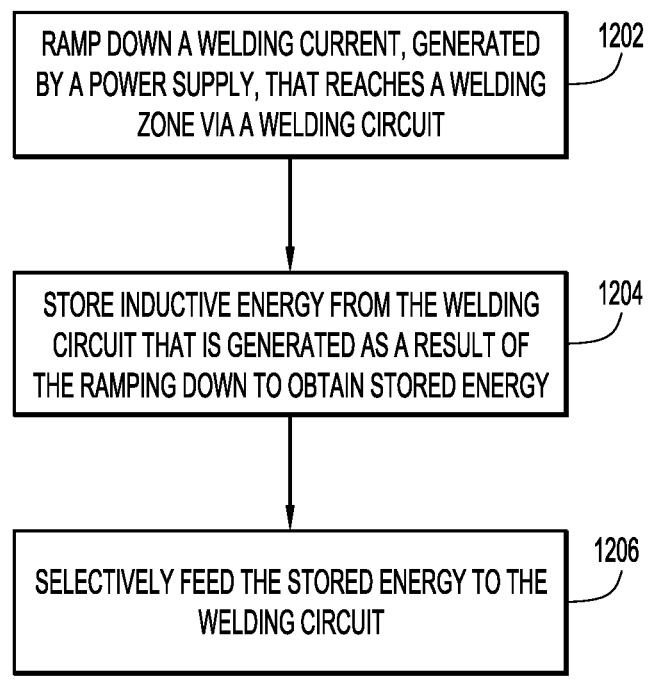
FIG. 12 is a flow chart illustrating a series of operations for operating a current braking energy recovery approach according to an example embodiment.

FIG. 12 is a flow chart illustrating a series of operations for operating a current braking energy recovery approach according to an example embodiment. At 1202, logic, e.g., power supply control logic 350, is configured to ramp down a welding current, generated by a power supply or source, that reaches a welding zone via a welding circuit. The logic, at 1204, is further configured to store inductive energy that is generated as a result of the ramping down to obtain stored energy. And, at 1206, the logic is configured to selectively feed the stored energy back to the welding circuit.

Figure 13:
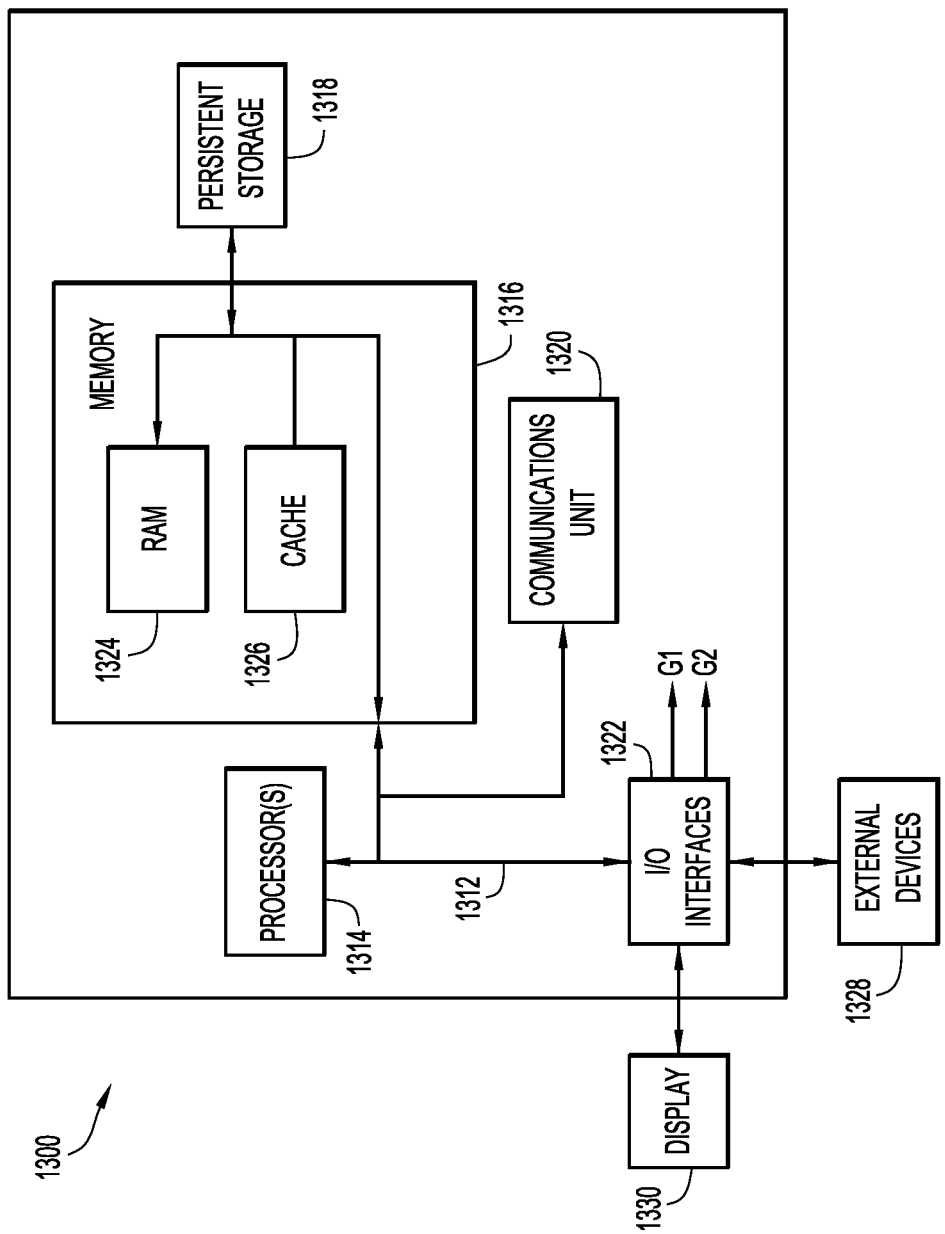
FIG. 13 depicts a computing device that is part of a welding power supply that may be configured to execute, among other things, the series of operations of FIG. 12 according to an example embodiment.

FIG. 13 depicts a computing device that is part of a welding power supply that may be configured to execute, among other things, the series of operations of FIG. 12 according to an example embodiment. More specifically, FIG. 13 depicts a device (e.g., a welding power supply, or portions thereof) that executes power supply control logic 350 to perform the operations described herein. It should be appreciated that FIG. 13 provides only an illustration of one embodiment and does not imply any limitations with regard to the environments in which different embodiments may be implemented. Many modifications to the depicted environment may be made. Indeed, in many implementations of a controller configured to host power supply control logic 350, much of the hardware described below may not be needed.

As depicted, the device 1300 includes a bus 1312, which provides communications between computer processor(s) 1314, memory 1316, persistent storage 1318, communications unit 1320, and input/output (I/O) interface(s) 1322. Bus 1312 can be implemented with any architecture designed for passing data and/or control information between processors (such as microprocessors, communications and network processors, etc.), system memory, peripheral devices, and any other hardware components within a system. For example, bus 1312 can be implemented with one or more buses.

Memory 1316 and persistent storage 1318 are computer readable storage media. In the depicted embodiment, memory 1316 includes random access memory (RAM) 1324 and cache memory 1326. In general, memory 1316 can include any suitable volatile or non-volatile computer readable storage media. Instructions for appropriate logic may be stored in memory 1316 or persistent storage 1318 for execution by processor(s) 1314.

One or more programs may be stored in persistent storage 1318 for execution by one or more of the respective computer processors 1314 via one or more memories of memory 1316. The persistent storage 1318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1318 may also be removable. For example, a removable hard drive may be used for persistent storage 1318. Other examples include optical and magnetic disks, thumb drives, and smart cards that are inserted into a drive for transfer onto another computer readable storage medium that is also part of persistent storage 1318.

Communications unit 1320, in these examples, provides for communications with other data processing systems or devices. In these examples, communications unit 1320 includes one or more network interface cards. Communications unit 1320 may provide communications through the use of either or both physical and wireless communications links.

I/O interface(s) 1322 allows for input and output of data with other devices that may be connected to computer device 1300. For example, I/O interface 1322 may provide a connection to external devices 1328 such as a keyboard, keypad, a touch screen, and/or some other suitable input device. External devices 1328 can also include portable computer readable storage media such as database systems, thumb drives, portable optical or magnetic disks, and memory cards. Gates G1 and G2 of switches S1 and S2 may also be connected via I/O interface(s) 1322.

Software and data used to practice embodiments can be stored on such portable computer readable storage media and can be loaded onto persistent storage 1318 via I/O interface(s) 1322. I/O interface(s) 1322 may also connect to a display 1330. Display 1330 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., embedded, desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To summarize, in one form, a method is provided and includes ramping down a welding current, generated by a power source, that reaches a welding zone via a welding circuit; storing inductive energy from the welding circuit that is generated as a result of the ramping down to obtain stored energy; and selectively feeding the stored energy to the welding circuit.

The method may further include enabling newly-generated welding current, generated by the power source, to reach the welding zone while simultaneously feeding the stored energy to the welding circuit.

The ramping down the welding current may include opening a switch disposed between the power source and the welding zone.

The method may still further include enabling newly-generated welding current, generated by the power source, to reach the welding zone by closing the switch.

Storing inductive energy may include storing the inductive energy in a capacitor, and the method may include pre-charging the capacitor.

The method may still also include selectively feeding the stored energy to the welding circuit by operating a converter, such as a buck converter.

The method may also include ramping down the welding current synchronously with a fuse of a welding wire droplet in a short arc welding operating mode.

In one implementation, the method feeds approximately 90% of the inductive energy back to the welding circuit.

In an implementation, selectively feeding the stored energy to the welding circuit includes controlling a switch to discharge a capacitor that stores the stored energy.

In another form an apparatus is provided. The apparatus includes a power source configured to deliver welding current to a welding zone via a welding circuit, a current brake disposed between the power source and the welding zone, and a braking energy recovery module configured to: ramp down the welding current, generated by the power source, that reaches the welding zone via the welding circuit, store inductive energy from the welding circuit that is generated as a result of the ramping down to obtain stored energy; and selectively feed the stored energy to the welding circuit.

In the apparatus the braking energy recovery module may be further configured to enable newly-generated welding current, generated by the power source, to reach the welding zone while simultaneously feeding the stored energy to the welding circuit.

In the apparatus, the braking energy recovery module may be further configured to ramp down the welding current, generated by the power source, by opening a switch disposed between the power source and the welding zone In the apparatus, the braking energy recovery module is further configured to enable newly-generated welding current, generated by the power source, to reach the welding zone by closing the switch.

In an embodiment, the braking energy recovery module may be further configured to store the inductive energy by storing the inductive energy in a capacitor.

In still another embodiment, the braking energy recovery module may be further configured to selectively feed the stored energy to the welding circuit by operating a buck converter In yet another form, one or more non-transitory computer-readable storage media are encoded with software comprising computer executable instructions and, when the software is executed, are operable to: ramp down a welding current, generated by a power source, that reaches a welding zone via a welding circuit, store inductive energy from the welding circuit that is generated as a result of the ramp down to obtain stored energy, and selectively feed the stored energy to the welding circuit.

The software may be further configured to enable newly-generated welding current, generated by the power source, to reach the welding zone while simultaneously feeding the stored energy to the welding circuit.

The software may also be further configured to ramp down the welding current, generated by the power source, that reaches the welding zone by opening a switch disposed between the power source and the welding zone.

The software may also be further configured to selectively feed the stored energy to the welding circuit by operating a buck converter.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
ramping down a welding current during a welding wire fuse event of a short arc welding process, the welding current being generated by a power source and reaching a welding zone via a welding circuit;
storing inductive energy from welding cables in the welding circuit that is generated as a result of the ramping down to obtain stored energy; and
selectively feeding the stored energy to the welding circuit after the fuse event is finished.

2. The method of claim 1, further comprising enabling newly-generated welding current, generated by the power source, to reach the welding zone while simultaneously feeding the stored energy to the welding circuit.

3. The method of claim 1, wherein ramping down the welding current comprises opening a switch disposed between the power source and the welding zone.

4. The method of claim 3, further comprising enabling newly-generated welding current, generated by the power source, to reach the welding zone by closing the switch.

5. The method of claim 1, wherein storing inductive energy comprises storing the inductive energy in a capacitor.

6. The method of claim 5, further comprising pre-charging the capacitor.

7. The method of claim 1, wherein selectively feeding the stored energy to the welding circuit comprises operating a converter.

8. The method of claim 1, further comprising feeding approximately 90% of the inductive energy back to the welding circuit.

9. The method of claim 1, wherein selectively feeding the stored energy to the welding circuit comprises controlling a switch to discharge a capacitor that stores the stored energy.

10. An apparatus, comprising:
a power source configured to deliver welding current via welding cables to a welding zone via a welding circuit;
a current brake disposed between the power source and the welding zone; and
a braking energy recovery module configured to:
ramp down the welding current during a welding wire fuse event of a short arc welding process using the current brake, the welding current being generated by the power source and reaching the welding zone via the welding circuit;
store inductive energy from the welding cables in the welding circuit that is generated as a result of the ramp down to obtain stored energy; and
selectively feed the stored energy to the welding circuit after the fuse event is finished.

11. The apparatus of claim 10, wherein the braking energy recovery module is further configured to enable newly-generated welding current, generated by the power source, to reach the welding zone while simultaneously feeding the stored energy to the welding circuit.

12. The apparatus of claim 10, wherein the braking energy recovery module is further configured to ramp down the welding current, generated by the power source, by opening a switch disposed between the power source and the welding zone and that operates as the current brake.

13. The apparatus of claim 12, wherein the braking energy recovery module is further configured to enable newly-generated welding current, generated by the power source, to reach the welding zone by closing the switch.

14. The apparatus of claim 10, wherein the braking energy recovery module is further configured to store the inductive energy by storing the inductive energy in a capacitor.

15. The apparatus of claim 10, wherein the braking energy recovery module is further configured to selectively feed the stored energy to the welding circuit by operating a buck converter.

16. One or more non-transitory computer readable storage media encoded with software comprising computer executable instructions and, when the software is executed, operable to:
    ramp down a welding current during a welding wire fuse event of a short arc welding process, the welding current being generated by a power source and reaching a welding zone via a welding circuit;
    store inductive energy from welding cables in the welding circuit that is generated as a result of the ramp down to obtain stored energy; and
    selectively feed the stored energy to the welding circuit after the fuse event is finished.

17. The one or more non-transitory computer readable storage media of claim 16, wherein when the software is executed, the software is operable to:
    enable newly-generated welding current, generated by the power source, to reach the welding zone while simultaneously feeding the stored energy to the welding circuit.

18. The one or more non-transitory computer readable storage media of claim 16, wherein when the software is executed, the software is operable to:
    ramp down the welding current, generated by the power source, that reaches the welding zone by opening a switch disposed between the power source and the welding zone.

19. The one or more non-transitory computer readable storage media of claim 17, wherein when the software is executed, the software is operable to:
    selectively feed the stored energy to the welding circuit by operating a buck converter.

* * * * *